US009749534B2

(12) United States Patent
Martinello

(10) Patent No.: US 9,749,534 B2
(45) Date of Patent: Aug. 29, 2017

(54) DEVICES, SYSTEMS, AND METHODS FOR ESTIMATION OF MOTION BLUR FROM A SINGLE IMAGE

(71) Applicant: CANON KABUSHIKI KAISHA, Tokyo (JP)

(72) Inventor: Manuel Martinello, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/981,392

(22) Filed: Dec. 28, 2015

(65) Prior Publication Data

US 2016/0191802 A1 Jun. 30, 2016

Related U.S. Application Data

(60) Provisional application No. 62/098,759, filed on Dec. 31, 2014.

(51) Int. Cl.
*H04N 5/232* (2006.01)
*H04N 9/04* (2006.01)
*G06T 5/20* (2006.01)

(52) U.S. Cl.
CPC .......... *H04N 5/23267* (2013.01); *G06T 5/20* (2013.01); *H04N 5/23254* (2013.01); *H04N 9/045* (2013.01); *G06T 2207/10024* (2013.01)

(58) Field of Classification Search
None
See application file for complete search history.

(56) References Cited

U.S. PATENT DOCUMENTS

| 8,537,234 B2 | 9/2013 | Litvinov | |
| 9,036,032 B2 * | 5/2015 | Ishii .................... | H04N 5/23248 348/208.4 |
| 2006/0279639 A1* | 12/2006 | Silverstein ......... | H04N 5/23248 348/208.14 |
| 2010/0053346 A1* | 3/2010 | Mitsunaga ......... | H04N 5/23248 348/208.6 |
| 2012/0287276 A1* | 11/2012 | Dwivedi ............ | G06K 9/00825 348/148 |

OTHER PUBLICATIONS

Interactive motion deblurring using light streaks, Hua, Binh-son et al, 2011.*

(Continued)

*Primary Examiner* — James Hannett
(74) *Attorney, Agent, or Firm* — Canon U.S.A., Inc. IP Division

(57) ABSTRACT

Devices, systems, and methods for estimating blur in an image obtain an image, identify pixels in the image that have intensity values that equal or exceed a first intensity threshold in a first color channel, and identify a trajectory based on the pixels in the image that have intensity values that exceed the first intensity threshold in the first color channel. Also, the devices, systems, and methods identify multiple instances of the trajectory in the image, identify an instance of the trajectory that includes pixels that have intensity values that do not equal or exceed a second intensity threshold in a second color channel, and generate a blur kernel based on the intensity values in the second color channel of the pixels in the instance of the trajectory.

22 Claims, 10 Drawing Sheets

(56) References Cited

OTHER PUBLICATIONS

Wei-Sheng Lai et al., Blur Kernel Estimation using Normalized Color-Line Priors, CVPR 2015, Jun. 2015.
Ziyang Ma et al., Handling Motion Blur in Multi-Frame Super-Resolution, CVPR 2015, Jun. 2015.
Ali Mosleh et al., Camera Intrinsic Blur Kernel Estimation: A Reliable Framework, CVPR 2015, Jun. 2015.
Ramesh Raskar et al, Coded Exposure Photography: Motion Deblurring using Fluttered Shutter, ACM SIGGRAPH 2006, Jul. 2006.
Oliver Whyte et al, Deblurring Shaken and Partially Saturated Images, International Journal of Computer Vision, Nov. 2014.
Oliver Whyte et al., Non-uniform Deblurring for Shaken Images, International Journal of Computer Vision, Jun. 2012.
Haifeng Liu et al., Deblurring Saturated Night Image With Function-Form Kernel, IEEE Transactions on Image Processing, Nov. 2015.
Felix Heide et al., FlexISP: A Flexible Camera Image Processing Framework, ACM Transactions on Graphics (TOG)—Proceedings of ACM SIGGRAPH Asia 2014, vol. 33 Issue 6, Nov. 2014.
Stephen J. Olivas et al., Platform motion blur image restoration system, Imaging and Applied Optics Technical Digest, Jun. 2012.
Stephen Joseph Olivas, Physical Optics Based Computational Imaging Systems, May 2015.

\* cited by examiner

DEVICES, SYSTEMS, AND METHODS FOR ESTIMATION OF MOTION BLUR FROM A SINGLE IMAGE

CROSS-REFERENCE TO RELATED APPLICATIONS

This application claims the benefit of U.S. Provisional Application No. 62/098,759, which was filed on Dec. 31, 2014.

BACKGROUND

Technical Field

This application generally relates to estimating the motion blur in images.

Background

When taking a photo at night, a camera must use a long exposure time to capture enough light from the scene. If the camera is hand-held during the capture, the camera slightly shakes and generates a blurred image.

SUMMARY

In some embodiments, a device comprises one or more computer-readable media and one or more processors that are coupled to the one or more computer-readable media. Also, the one or more processors are configured to cause the device to obtain an image, identify pixels in the image that have intensity values that equal or exceed a first intensity threshold in a first color channel, and identify a trajectory based on the pixels in the image that have intensity values that exceed the first intensity threshold in the first color channel. Furthermore, the one or more processors are configured to cause the device to identify multiple instances of the trajectory in the image, identify an instance of the trajectory that includes pixels that have intensity values that do not equal or exceed a second intensity threshold in a second color channel, and generate a blur kernel based on the intensity values in the second color channel of the pixels in the instance of the trajectory.

In some embodiments, a method comprises obtaining an image, identifying a trajectory in the image based on pixels in the image that have intensity values that exceed a first intensity threshold in a first color channel, identifying a second color channel for which the trajectory includes pixels that have intensity values that do not equal or exceed a second intensity threshold, and generating a blur kernel based on the intensity values in the second color channel of the pixels in the trajectory.

In some embodiments, one or more non-transitory computer-readable media store instructions that, when executed by one or more computing devices, cause the one or more computing devices to obtain an image, identify a trajectory in the image based on pixels in the image that have intensity values that exceed a first intensity threshold in a first color channel and that have intensity values that do not exceed a second intensity threshold in a second color channel, and generate a point spread function based on the intensity values in the second color channel of the pixels in the trajectory.

DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
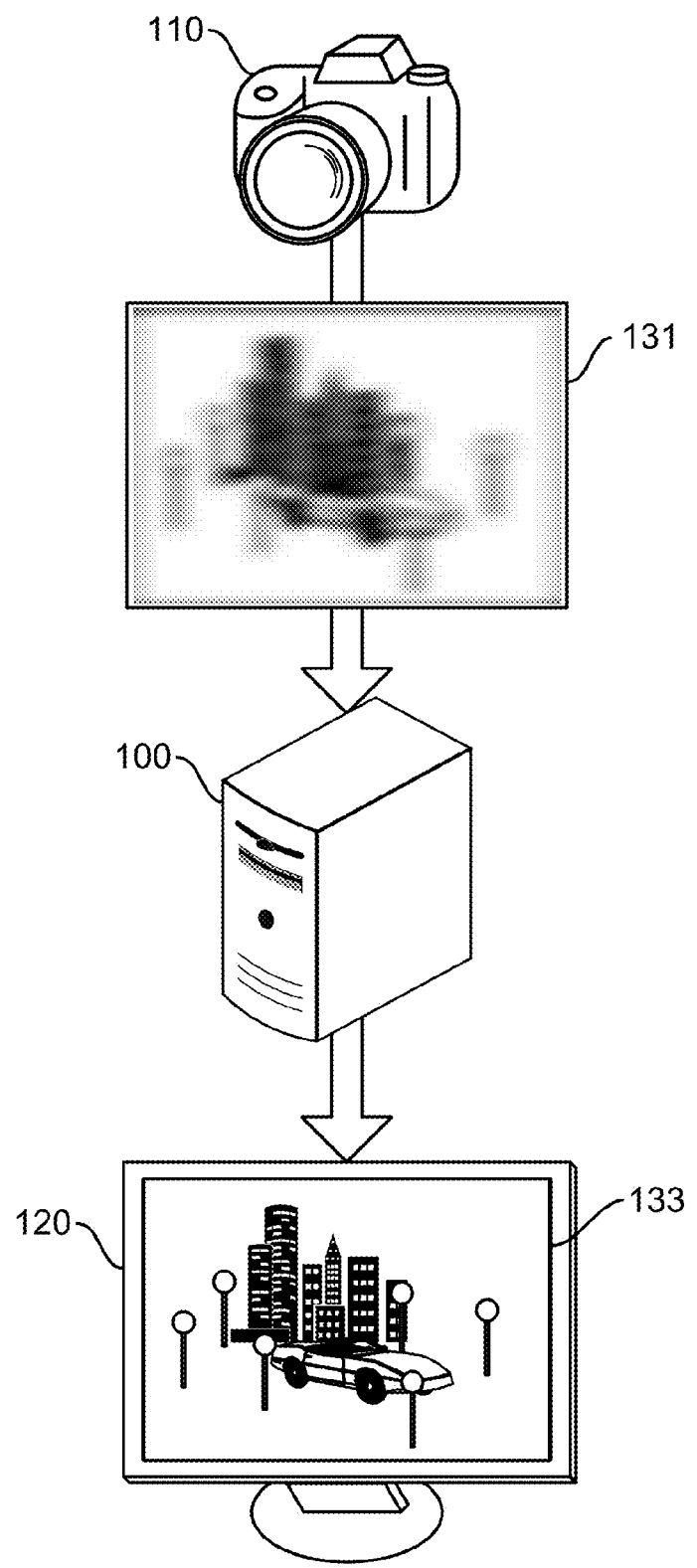
FIG. 1 illustrates the flow of operations in an example embodiment of a system for estimating motion blur from a single image.

FIG. 1 illustrates the flow of operations in an example embodiment of a system for estimating motion blur from a single image. A camera 110 captures an image 131, and one or more blur-estimation devices 100 obtain the captured image 131. The blur-estimation devices 100 calculate the motion blur in the image 131. Also, the one or more blur-estimation devices 100 may generate a deblurred image 133 and send the deblurred image 133 to a display device 120.

To calculate the motion blur, some embodiments of the one or more blur-estimation devices 100 perform the following operations: First, the one or more blur-estimation devices 100 set an initial intensity threshold (e.g., the maximum output value of the camera sensor). For example, for an 8-bit RGB image, 255 may be set as the initial intensity threshold.

Next, the one or more blur-estimation devices 100 identify the pixels in the image 131 that have intensity values that exceed the intensity threshold in at least one color channel. Saturated pixels are pixels that have intensity values that exceed the intensity threshold. In a night photograph, artificial-light spots in the scene are usually clipped (i.e., recorded with the maximum intensity value that is possible in the image). The one or more blur-estimation devices 100 identify the saturated pixels (e.g., the clipped pixels) to find the artificial-light spots because, in a night scenario, the artificial-light spots carry information about any relative motion between the camera 110 and the scene.

However, if the one or more blur-estimation devices 100 cannot identify enough saturated pixels in at least one color channel, then the one or more blur-estimation devices 100 lower the intensity threshold and again identify the saturated pixels.

Once the one or more blur-estimation devices 100 identify enough saturated pixels, then the one or more blur-estimation devices 100 find a trajectory of the motion. The trajectory is continuous, may be sparse, and may be repeated—same version, thinner, or thicker—in multiple instances across the image.

Next, the one or more blur-estimation devices 100 select an instance of a trajectory and check if the saturated pixels in the instance of the trajectory have intensity values that are not clipped in at least one color channel. If the intensity values of an instance of a trajectory are clipped in all of the color channels, then the one or more blur-estimation devices 100 select a new instance of a trajectory. Finally, if the intensity values of an instance of a trajectory are not clipped in at least one of the color channels, then the one or more blur-estimation devices 100 use the intensity values (e.g., normalized intensity values) of the instance's pixels in a non-clipped color channel to generate a blur kernel (i.e., a point spread function (PSF)).

Figure 2:
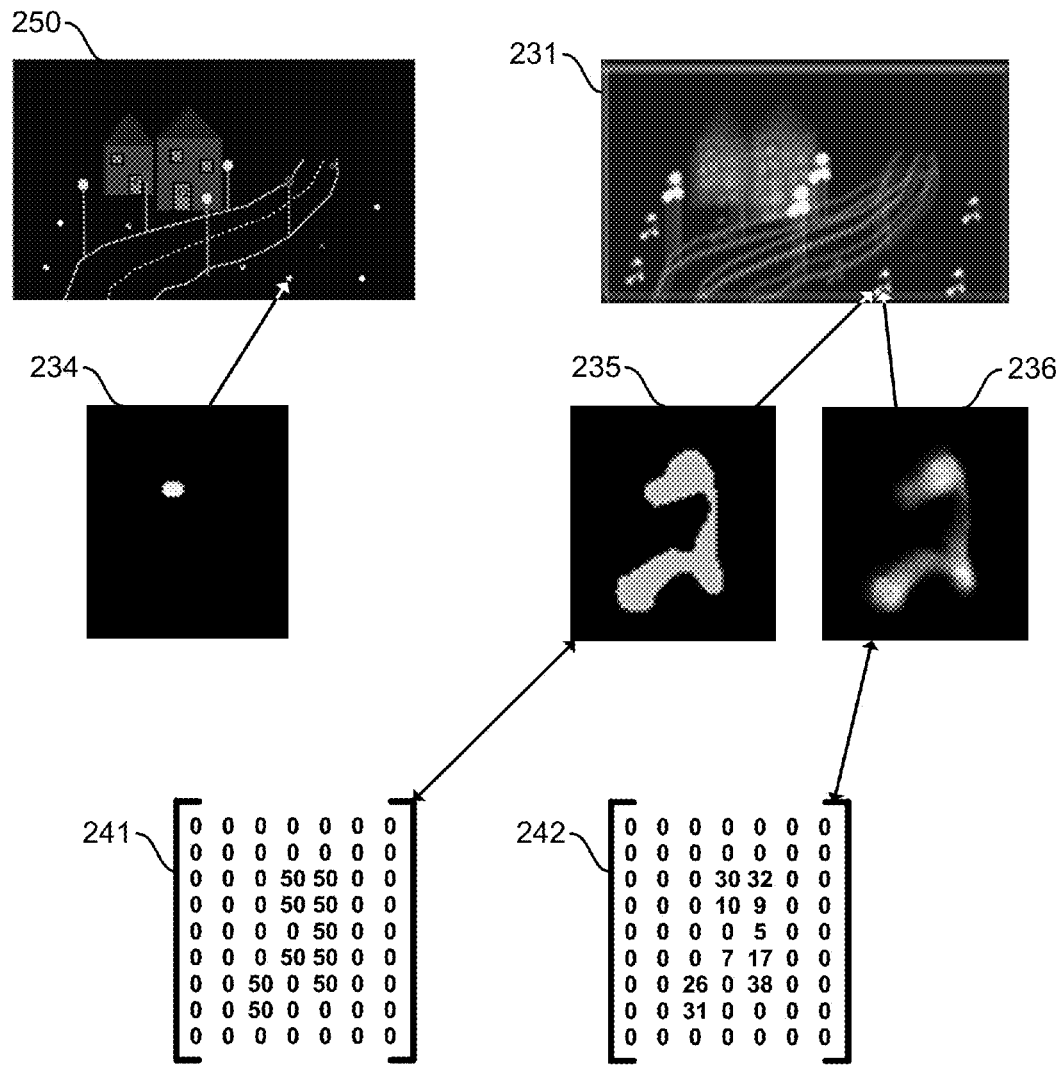
FIG. 2 illustrates example embodiments of a scene, an image of the scene, a light spot in the scene, a first kernel view, a second kernel view, a trajectory matrix, and a weight matrix of the trajectory.

FIG. 2 illustrates example embodiments of a scene 250, an image 231 of the scene 250, a light spot 234 in the scene 250, a first kernel view 235, a second kernel view 236, a trajectory matrix 241 of the motion, and a weight matrix 242 of the motion.

If a camera captures an image of the scene 250, which includes the light spot 234, and if the camera and the light spot 234 do not move, relative to each other, during the exposure time, then the resulting image of the light spot would look much like the light spot 234. However, if there is a relative motion between the light spot 234 and the camera during exposure, then the light spot 234 will be blurred in the captured image, for example as shown by the image 231. The image 231 can show uniform motion of the light spot 234, as shown by the first kernel view 235, when the relative motion is uniform (e.g., a vehicle headlight that moves at a constant speed in the scene) or when the intensity values of the pixels in the first kernel view 235 are clipped in one or more color channels.

But if the intensity values are clipped, then the first kernel view 235 can show uniform motion of the light spot 234 even when the relative motion was not uniform. However, even if the intensity values are clipped in one color channel, the intensity values may not be clipped in another color channel. In FIG. 2, the intensity values are clipped in the first kernel view 235, which shows the light spot 234 in the image 231 in a first color channel. But the intensity values are not clipped in the second kernel view 236, which shows the light spot 234 in the image 231 in a second color channel. In the second kernel view 236, the grayscale values indicate the relative time that the camera spent at a specific location during the image capture.

Accordingly, when the pixels of the image 231 are examined in the component color channels, a particular light spot 234 may produce both the first kernel view 235 and the second kernel view 236. For example, a red light spot in the scene 250 might produce clipped intensity values in the image 231 for the red channel, thereby producing the first kernel view 235. The first kernel view 235 in the red channel can be used to estimate the trajectory of the motion of the camera relative to the scene 250. Also, since the red light spot has a less-intense green component, in the green channel the first kernel view 235 may appear like the second kernel view 236. Thus, this second kernel view 236 in the green channel can be used to obtain the weights for the PSF.

In some embodiments, the trajectory, which is shown in the first kernel view 235, is represented by a trajectory matrix 241. The trajectory matrix 241 shows the intensity values in a saturated (e.g., clipped) color channel. In this example embodiment, the maximum value that a pixel can have is 50. The trajectory matrix 241 shows all values that are less than 50 as zero. Thus, the non-zero values of the trajectory matrix 241 can be used to identify the trajectory of a light spot 234.

Additionally, the second kernel view 236 is represented by a weight matrix 242 of the trajectory, and the weight matrix 242 shows the intensity values in a non-saturated color channel (e.g., some intensity values are not saturated, all intensity values are not saturated). Also, if the intensity value of a pixel is zero in the trajectory matrix 241, then the intensity value of the pixel in the weight matrix 242 may be set to zero.

For example, if trajectory has intensity values that are clipped in a green color channel, and if the non-zero intensity values of the trajectory matrix 241 show the intensity values of the pixels in the green color channel, then the weight matrix 242 shows the intensity values of the pixels that are clipped in the green color channel in another color channel (e.g., red, infrared, blue).

Furthermore, second kernel view 236, which is described by the weight matrix 242, can be used to generate a blur kernel. For example, the second kernel view 236 can be considered to be the blur kernel that represents the motion of the camera. Thus, some embodiments use the weight matrix 242 itself as a blur kernel (e.g., in the case where the light spot that generated the blur 242 is very small). Also, the weight matrix 242 can be used to generate another form of a blur kernel (e.g., in the case where the light that generated the blur 242 is not a small static spot).

Figure 3:
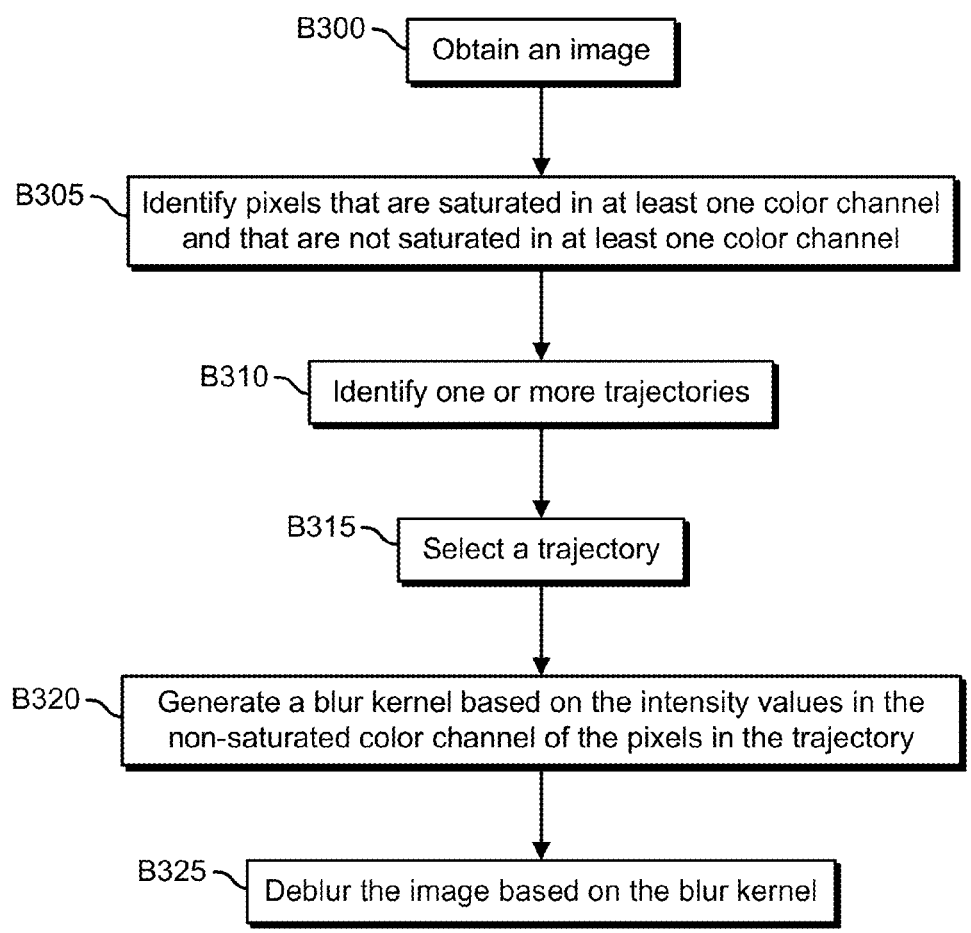
FIG. 3 illustrates an example embodiment of an operational flow for estimating motion blur in an image.

FIG. 3 illustrates an example embodiment of an operational flow for estimating motion blur in an image. The blocks of this operational flow and the other operational flows that are described herein may be performed by one or more computing devices, for example the computing devices (e.g., blur-estimation devices) that are described herein. Also, although this operational flow and the other operational flows that are described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this operational flow and the other operational flows that are described herein may omit blocks, add blocks, change the order of the blocks, combine blocks, or divide blocks into more blocks.

The flow starts in block B300, where an image is obtained (e.g., by a blur-estimation device). The flow then moves to block B305, where pixels that have intensity values that are both saturated (e.g., clipped) in at least one color channel and not saturated in at least one color channel are identified. For example, in an RGB image, pixels that have intensity values that are clipped in the red color channel, but not in the blue color channel, satisfy these conditions.

Next, in block B310, one or more trajectories are identified based on the pixels that were identified in block B305. The one or more trajectories may be sparse, continuous, and repeated. The flow then moves to block B315, where a trajectory is selected. Then, in block B320, a blur kernel is generated (e.g., calculated) based on the intensity values in the non-saturated color channel of the pixels in the selected trajectory.

For example, a blurred image can be described according to the following:

$$g = h * f + n,$$

where h is the blur kernel (e.g., the weight matrix 242 in FIG. 2, the weight matrix 442 in FIG. 4), where f is the original (sharp) image, where n is noise that is added during image acquisition, and where * is the convolution operator. The blurred image g is described by the convolution of the blur kernel h with the original (sharp) image f plus the noise n.

Also for example, a blurred image can be described according to the following:

$$g = Hf + n,$$

where g is the blurred image, where H is a matrix that includes the blur kernel h for each pixel (e.g., the blur matrix 545 in FIG. 5), where f is the original (sharp) image, and where n is noise that is added during image acquisition. Additionally, g and f are rearranged as one-dimensional vectors.

Some embodiments use the weight matrix (e.g., the weight matrix 242 in FIG. 2, the weight matrix 442 in FIG. 4) of the trajectory as the blur kernel h. If the blur kernel h uses the intensity values from two or more non-saturated color channels, then the blur kernel h may use an average intensity value of the non-saturated color channels at a pixel for the weight of the pixel in a weight matrix.

Finally, in block B325, which is optional in some embodiments, the image is deblurred based on the blur kernel, for example by means of deconvolution.

Figure 4:
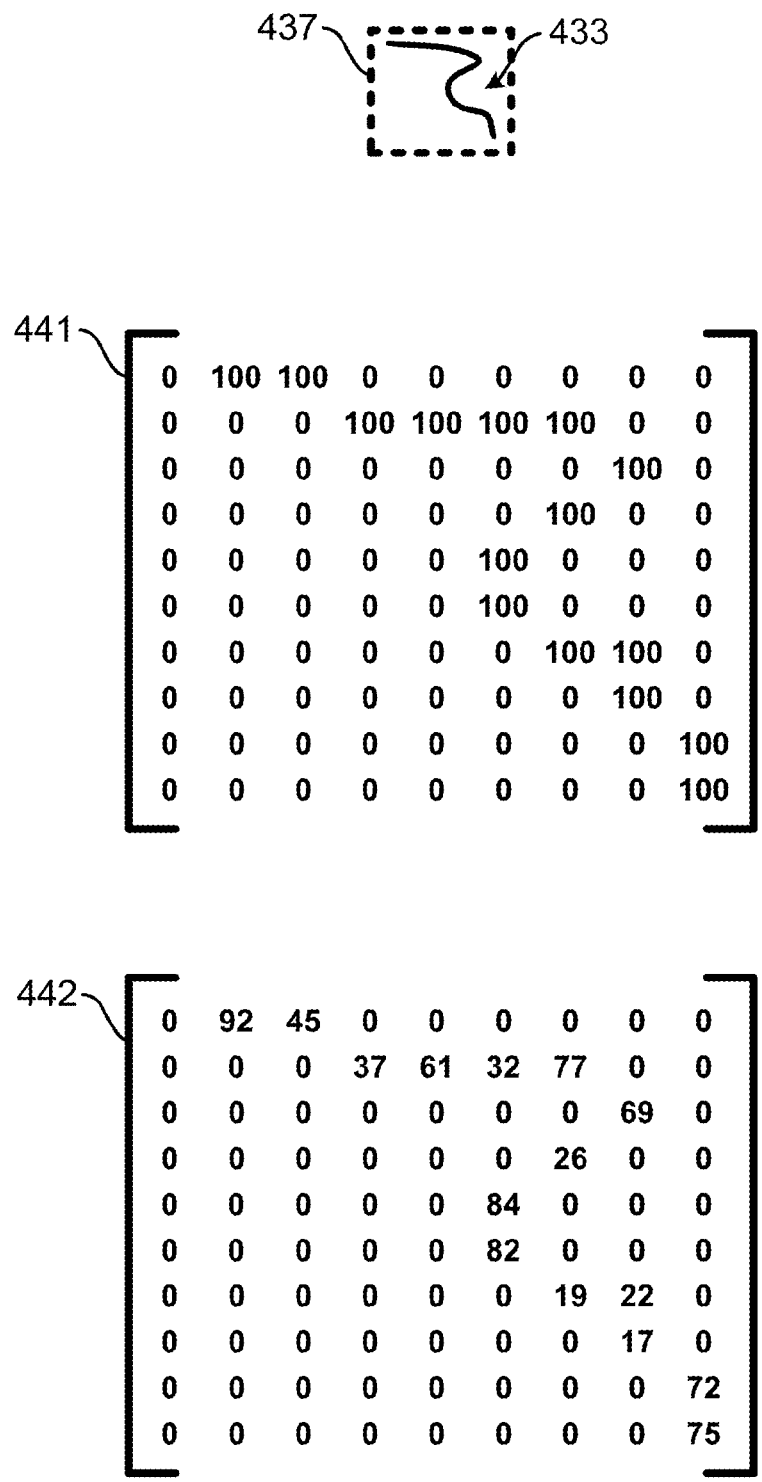
FIG. 4 illustrates example embodiments of a trajectory, a trajectory matrix that represents the saturated pixels that compose the trajectory, and a weight matrix that represents the unsaturated pixels that compose the trajectory.

FIG. 4 illustrates example embodiments of a trajectory 433, a trajectory matrix 441 that represents the saturated pixels that compose the trajectory, and a weight matrix 442 that represents the unsaturated pixels that compose the trajectory. The trajectory 433 is shown in a trajectory area 437. The intensity values of the pixels in the trajectory 433 exceed an intensity threshold in a first color channel and do not exceed the intensity threshold in a second color channel. In this example embodiment, the intensity threshold is 100, which is the maximum intensity value that a pixel can have in a color channel.

The trajectory matrix 441 shows the saturated intensity values in the first color channel in matrix form. The other intensity values are set to zero in this embodiment. The trajectory matrix 441 can be used to identify a trajectory in an image.

Also, the weight matrix 442 shows the unsaturated intensity values in the second color channel in matrix form. The intensity values of the pixels that are not saturated in the first color channel are set to zero in this embodiment. The weight matrix 442 can be used to generate the blur kernel. Also, some embodiments use the trajectory matrix 441 to generate the blur kernel.

Figure 5:
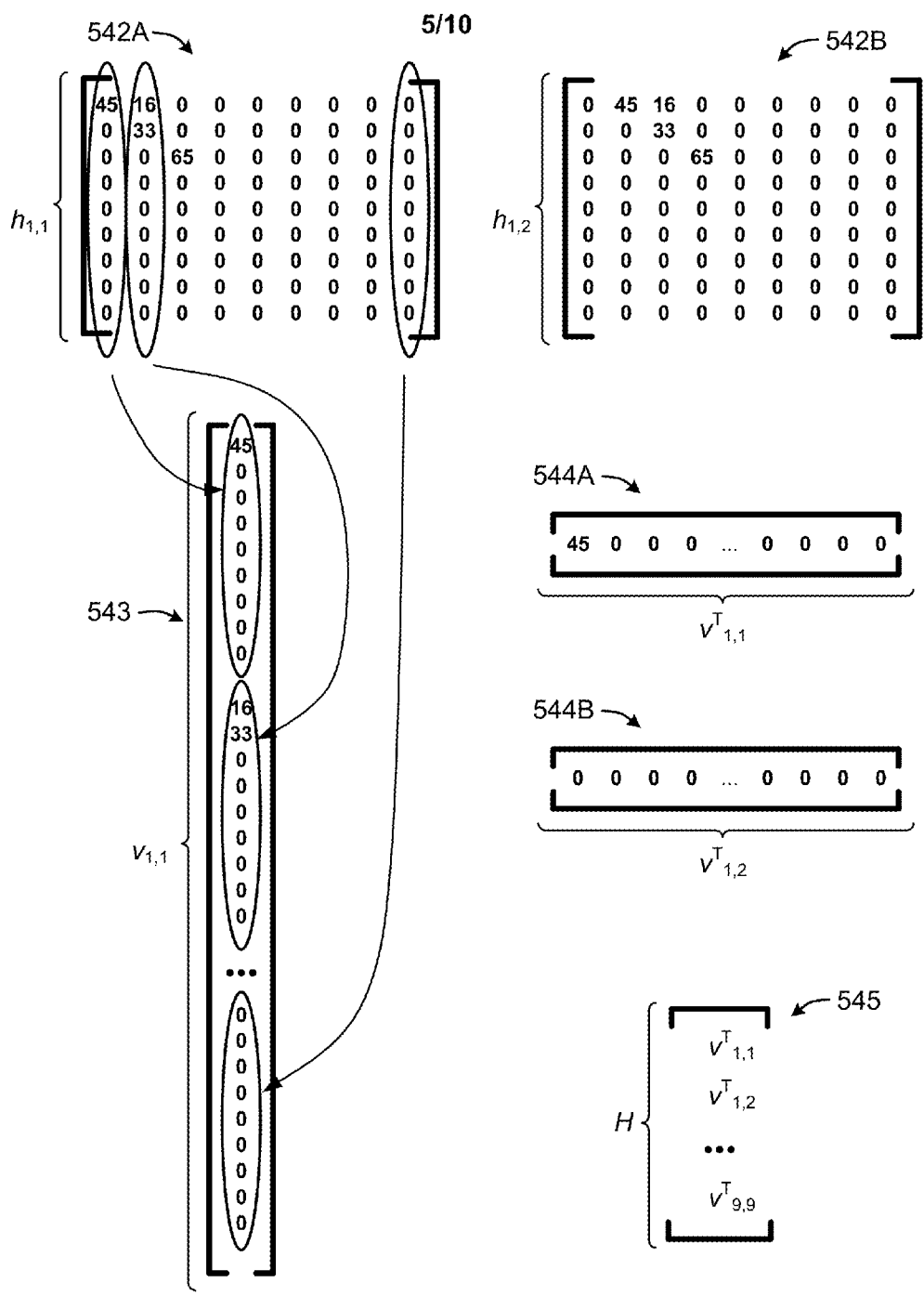
FIG. 5 illustrates an example embodiment of a representation of a blur for an image.

FIG. 5 illustrates an example embodiment of a representation of a blur 545 (a blur matrix H 545) for an image. In this embodiment, the blur kernel of a pixel (i,j) (where i,j are respectively the vertical and horizontal coordinates of the pixel in the image) is defined by the corresponding vector $v_{i,j}^T$. For example, the first vector $v_{1,1}^T$ 544A is a reshaped version of the kernel $h_{1,1}$ 542A, and it represents the motion blur applied to the original pixel at (1,1); the second vector $v_{1,2}^T$ 544B is a reshaped version of the kernel $h_{1,2}$ 542B and it represents the motion blur applied to the original pixel at (1,2).

To generate the vectors, the kernels $h_{i,j}$ are changed to a column vector form. For example, the first kernel $h_{1,1}$ 542A is changed to a column vector $v_{1,1}$ 543. The column vectors are then transposed. Thus, the first vector $v_{1,1}^T$ 544A is the transpose of the column vector $v_{1,1}$ 543. The blur matrix H 545 is generated by forming a matrix of the respective vectors $v_{i,j}^T$ of all of the kernels $h_{i,j}$.

Figure 6:
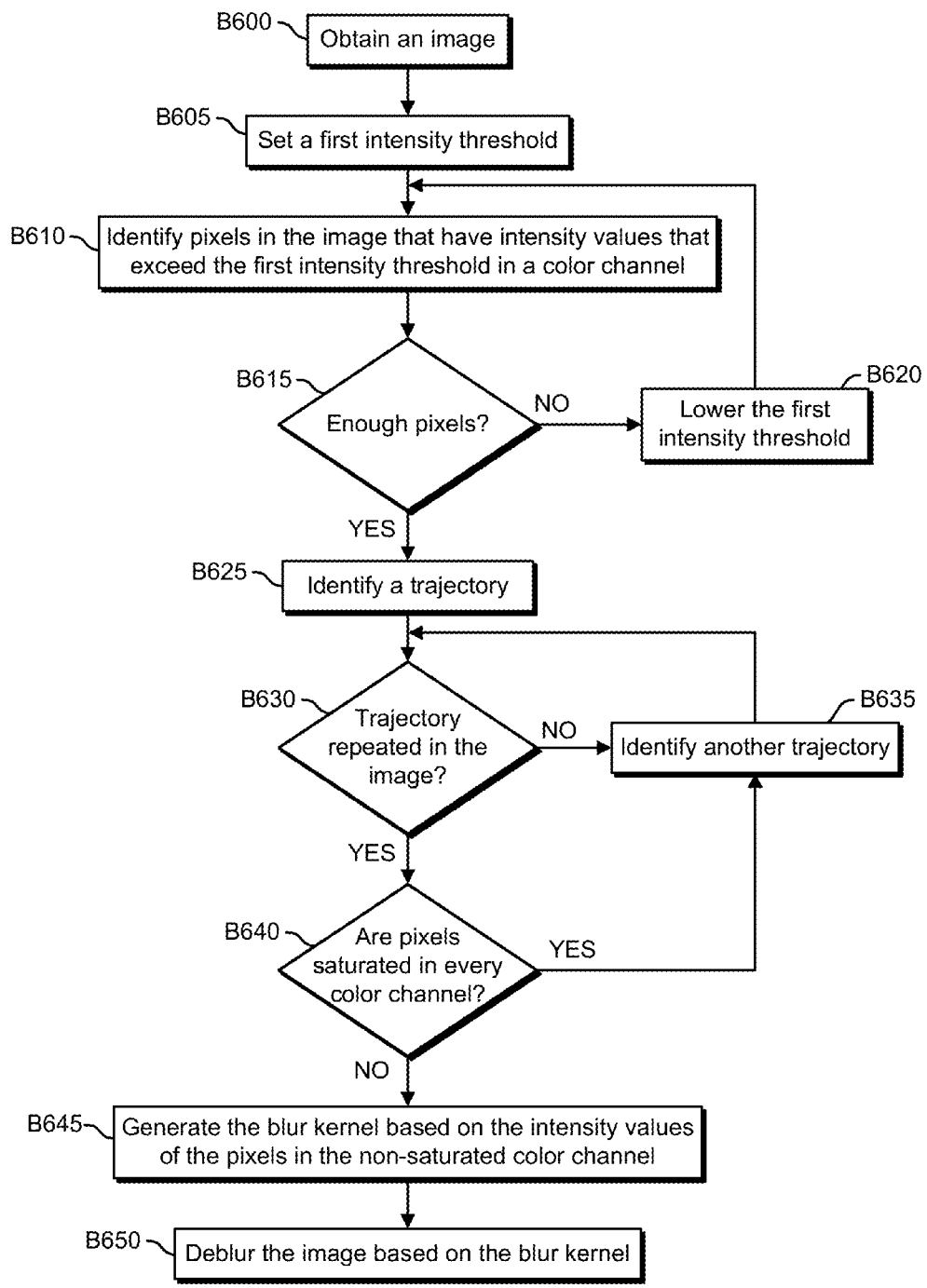
FIG. 6 illustrates an example embodiment of an operational flow for estimating motion blur in an image.

FIG. 6 illustrates an example embodiment of an operational flow for estimating motion blur in an image. The flow starts in block B600, where an image is obtained (e.g., by a blur-estimation device). Next, in block B605, a first intensity threshold is set. Some embodiments initially set the first intensity threshold to the maximum intensity value that a pixel in the image can have. For example, in an 8-bit RGB image, the first intensity threshold may be initially set to 255. In a 14-bit image, the first intensity threshold may be initially set to 16,383. Also, each color channel may have its own first intensity threshold, or the first intensity threshold may be shared by all color channels. The flow then moves to block B610, where pixels in the image that have intensity values that exceed the first intensity threshold in a color channel are identified. Some embodiments identify pixels in any color channel that have intensity values that exceed the first intensity threshold, and some embodiments identify pixels in only a subset (e.g., one) of the color channels.

Then the flow proceeds to block B615, where it is determined if enough pixels that have intensity values that exceed the first intensity threshold were identified in block B610. For example, in some embodiments, if 2-3% of the pixels have intensity values that exceed the first intensity threshold, then enough pixels have intensity values that exceed the first intensity threshold. If not (B615=NO), then the flow moves to block B620, where the intensity threshold is lowered, and then the flow returns to block B610. If enough pixels have intensity values that exceed the first intensity threshold (B615=YES), then the flow proceeds to block B625.

Figure 7A:
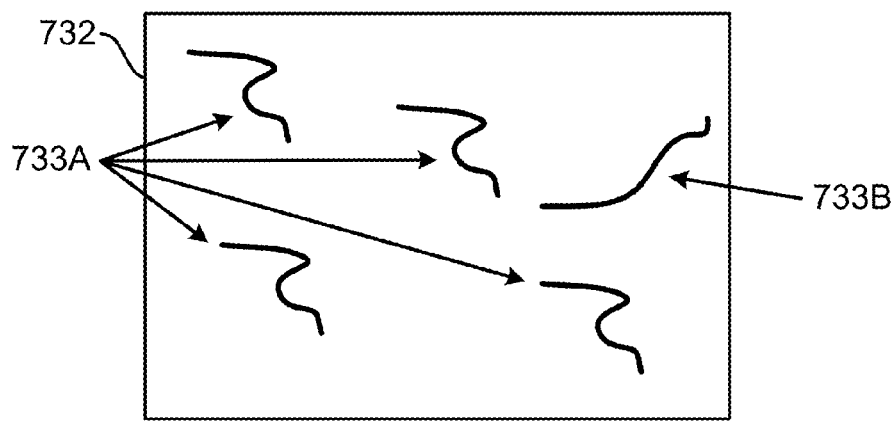
FIG. 7A illustrates an example embodiment of pixels in an image that have intensity values that exceed an intensity threshold.

In block B625, a trajectory in the image is identified. The trajectory may be sparse, continuous, and repeated. To identify the trajectory, the pixels that have intensity values that exceed the intensity threshold are evaluated. FIG. 7A illustrates an example embodiment of pixels in an image 732 that have intensity values that exceed an intensity threshold. A trajectory can be identified by finding the pixels that (1) have intensity values that exceed the intensity threshold, (2) form a continuous path, and (3) are surrounded by pixels that have intensity values that do not exceed the intensity threshold. FIG. 7A includes a first trajectory 733A and a second trajectory 733B, and the first trajectory 733A has four instances (i.e., the trajectory is repeated four times).

Then, referring again to FIG. 6, in block B630 it is determined if the trajectory is repeated (e.g., the image includes more than one instance of the trajectory) in the image. In some embodiments, the number of instances of the trajectory, which are the repetitions of the trajectory, must exceed a threshold.

Figure 7B:
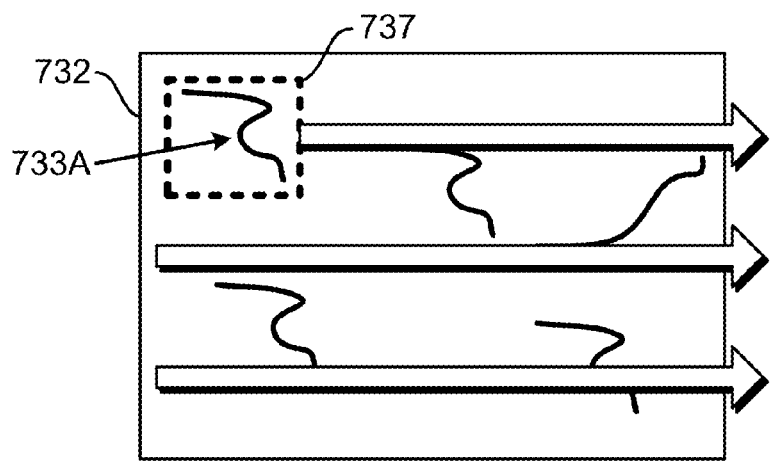
FIG. 7B illustrates an example embodiment of a search for other instances of a trajectory in an image.

FIG. 7B illustrates an example embodiment of a search for other instances of a trajectory 733A in an image 732. A trajectory area 737, which is an area that includes the trajectory 733A, is compared with other areas in the image. For example, some embodiments use normalized cross correlation between the trajectory area 737 and a candidate area and, if the cross correlation exceeds a threshold, then the trajectory is determined to be repeated (i.e., the image includes another instance of the trajectory). In some embodiments, as the comparison advances across a row, each iteration of the comparison evaluates a candidate area that is only one pixel to the right of the previous candidate area. Also, the comparison moves down one pixel as a new row is started.

Figure 7C:
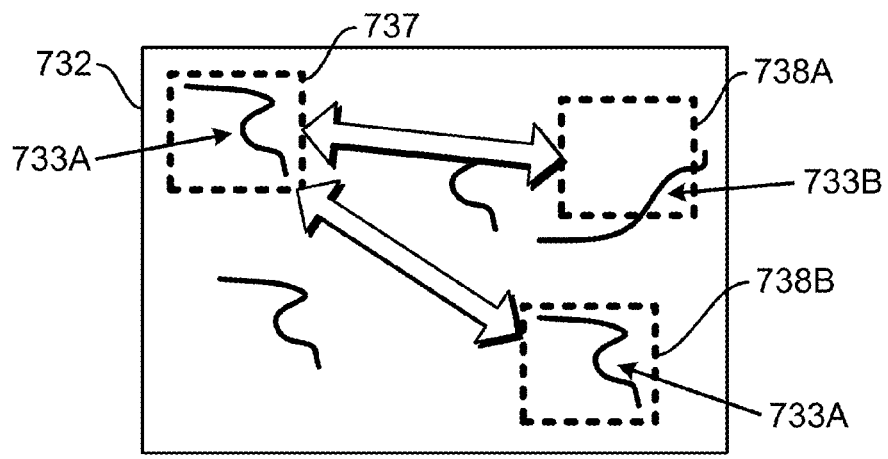
FIG. 7C illustrates an example embodiment of a comparison of a trajectory to other areas of an image.

FIG. 7C illustrates an example embodiment of a comparison of a trajectory 733A to other areas of an image 732. A trajectory area 737, which includes an instance of the trajectory 733A, is compared to a first candidate area 738A and a second candidate area 738B. The second candidate area 738B includes another instance of the trajectory 733A. Although the first candidate area 738A includes part of another trajectory 733B, the result of the comparison (e.g., the cross correlation) of the trajectory area 737 and the first candidate area 738A is very low or near zero. Thus, the first candidate area 738A is determined not to include another instance of the trajectory 733A. However, the result of the comparison of the trajectory area 737 and the second candidate area 738A exceeds a threshold, so the second candidate area 738B is determined to include another instance of the trajectory 733A.

Referring again to FIG. 6, if the trajectory is not repeated (B630=NO), then the flow moves to block B635, where another trajectory is identified, and then the flow returns to block B630. If the trajectory is determined to be repeated in the image (B630=YES), then the flow moves to block B640.

In block B640, it is determined if the intensity values of the pixels in the trajectory are saturated (e.g., clipped) in every color channel. In block B640, the intensity values of the pixels in the trajectory are compared to a second intensity threshold, which may be equal to or higher than the first intensity threshold from block B610. If the intensity values exceed the second intensity threshold (i.e., are saturated) in every color channel (B640=YES), then the flow moves to block B635. Furthermore, in some embodiments, the flow moves to block B635 if any of, or a certain percentage of, the intensity values in each color channel exceed the second intensity threshold. However, in some embodiments, the flow moves to block B635 only if all of the intensity values in each color channel exceed the second intensity threshold.

If the intensity values do not exceed the second intensity threshold (i.e., are not saturated) in at least one color channel (B640=NO), then the flow moves to block B645. Also, in some embodiments, the flow moves to block B645 if any of, or a certain percentage of, the intensity values in any of the color channels do not exceed the second intensity threshold. However, in some embodiments, the flow moves to block B645 only if all of the intensity values in at least one of the color channels do not exceed the second intensity threshold.

In block B645, a blur kernel is generated based on the intensity values (e.g., normalized intensity values) of the pixels in the non-saturated color channel. Finally, in block B650, which is optional in some embodiments, the image is deblurred based on the blur kernel.

Figure 8:
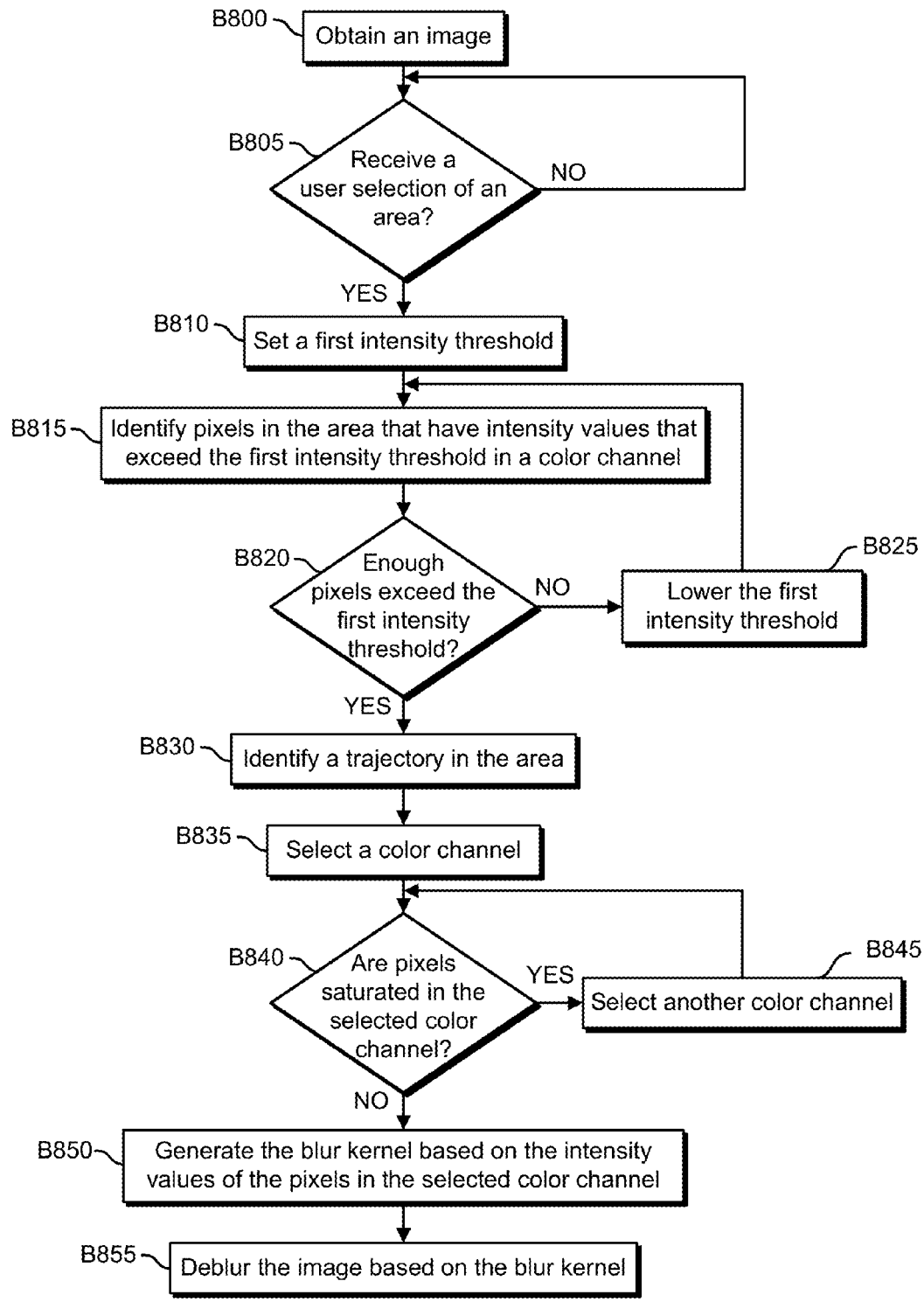
FIG. 8 illustrates an example embodiment of an operational flow for estimating motion blur in an image.

FIG. 8 illustrates an example embodiment of an operational flow for estimating motion blur in an image. The flow starts in block B800, where an image is obtained. The flow then moves to block B805, where it is determined if a user selection of an area has been received. For example, the user selection may be received by the selection of an area on a user interface that displays the image. Also for example, the user selection can be received by the user tracing a trajectory or an approximate trajectory on a user interface that displays the image. The selected area would then include the traced trajectory. In some embodiments, the selected area is the smallest rectangular subset of pixels that includes the entire traced trajectory.

If no user selection has been received (B805=NO), then the flow waits at block B805. If a user selection has been received (B805=YES), then the flow moves to block B810, where a first intensity threshold is set. Next, in block B815, the pixels in the selected area that have intensity values that exceed the first intensity threshold in a color channel are identified. The flow then proceeds to block B820, where it is determined if enough pixels that exceed the first intensity threshold were identified in block B815. If not (B820=NO), then the flow moves to block B825, where the first intensity threshold is lowered, and then the flow returns to block B815.

If enough pixels have intensity values that exceed the first intensity threshold (B820=YES), then the flow moves to block B830, where a trajectory is identified in the selected area. Next, in block B835, a color channel is selected. Then, in block B840, it is determined if the intensity values (e.g., some of the intensity values, all of the intensity values) of the pixels in the selected trajectory are saturated (i.e., exceed a second intensity threshold) in the selected color channel. If the intensity values are saturated (B840=YES), then the flow moves to block B845, where another color channel is selected, and then the flow returns to block B840. In some embodiments, if in block B845 it is determined that every color channel has previously been selected, then the flow returns to block B830.

If the intensity values (e.g., some of the intensity values, all of the intensity values) of the pixels in the selected trajectory are not saturated (B840=NO), then the flow moves to block B850. In block B850, the blur kernel is generated based on the intensity values of the trajectory's pixels in the selected color channel. Finally, in block B855, which is optional in some embodiments, the image is deblurred based on the blur kernel.

Figure 9:
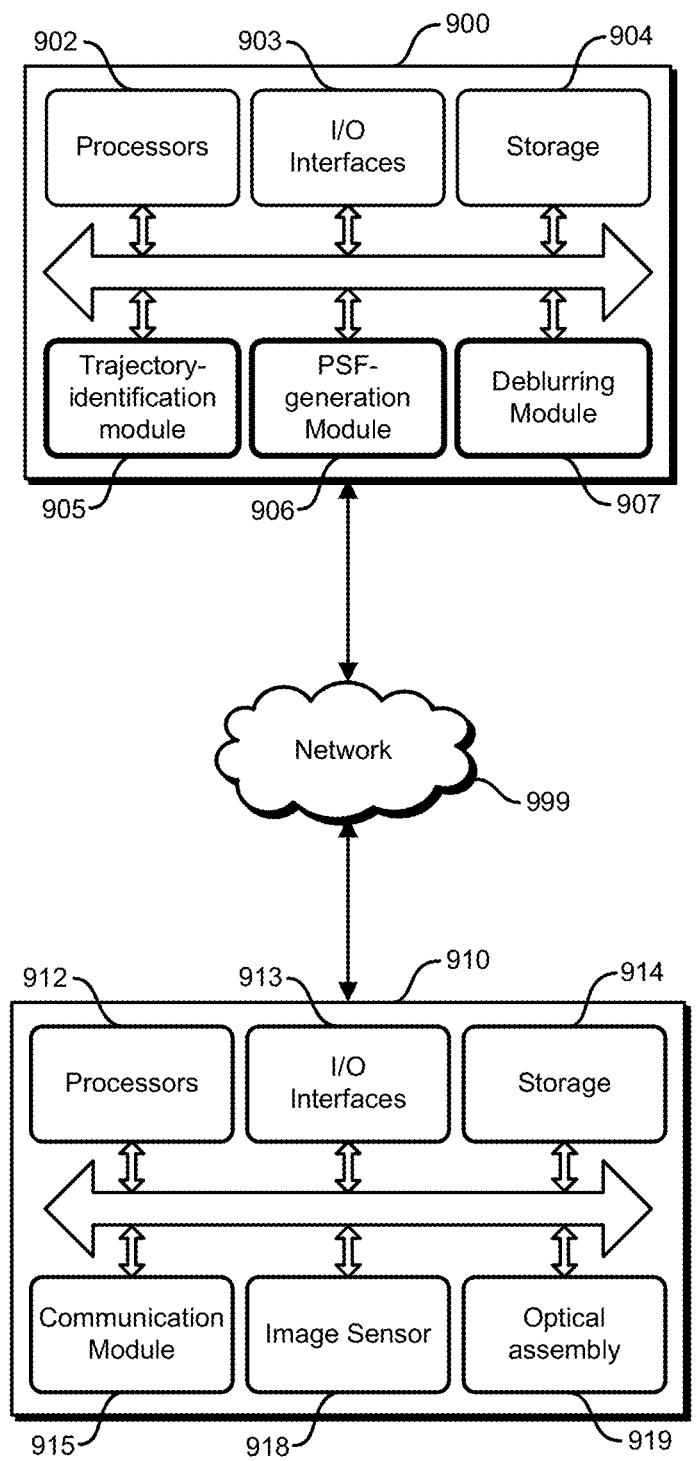
FIG. 9 illustrates an example embodiment of a system for estimating motion blur in an image.

FIG. 9 illustrates an example embodiment of a system for estimating motion blur in an image. The system includes a blur-estimation device 900 and a camera 910. Some embodiments include another image-storage device (e.g., a server) instead of a camera. In this embodiment, the devices communicate by means of one or more networks 999, which may include a wired network, a wireless network, a LAN, a WAN, a MAN, and a PAN. Also, in some embodiments the devices communicate by means of other wired or wireless channels.

The blur-estimation device 900 includes one or more processors 902, one or more I/O interfaces 903, and storage 904. Also, the hardware components of the blur-estimation device 900 communicate by means of one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 902 include one or more central processing units (CPUs), which include microprocessors (e.g., a single core microprocessor, a multi-core microprocessor), or other electronic circuitry. The one or more processors 902 are configured to read and perform computer-executable instructions, such as instructions that are stored in the storage 904 (e.g., ROM, RAM, a module). The I/O interfaces 903 include communication interfaces to input and output devices, which may include a keyboard, a display, a mouse, a printing device, a touch screen, a light pen, an optical-storage device, a scanner, a microphone, a camera, a drive, a controller (e.g., a joystick, a control pad), and a network interface controller.

The storage 904 includes one or more computer-readable storage media. A computer-readable storage medium, in contrast to a mere transitory, propagating signal per se, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 904, which may include both ROM and RAM, can store computer-readable data or computer-executable instructions.

The blur-estimation device 900 also includes a trajectory-identification module 905, a PSF-generation module 906, and a deblurring module 907. A module includes logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules. When the modules are implemented in software, the software can be stored in the storage 904.

The trajectory-identification module 905 includes instructions that, when executed, or circuits that, when activated, cause the blur-estimation device 900 to identify pixels in an image that have respective intensity values that exceed an intensity threshold in at least one color channel; identify trajectories in the image; and identify trajectories with pixels that have respective intensity values that do not exceed an intensity threshold in at least one color channel.

The PSF-generation module 906 includes instructions that, when executed, or circuits that, when activated, cause the blur-estimation device 900 to generate or update a blur kernel based on a trajectory's pixels that have intensity values that do not exceed the intensity threshold in at least one color channel.

The deblurring module 907 includes instructions that, when executed, or circuits that, when activated, cause the blur-estimation device 900 to generate a deblurred version of an image based on the blur kernel.

The camera 910 includes one or more processors 912, one or more I/O interfaces 913, storage 914, a communication module 915, an image sensor 918, and an optical assembly 919. The optical assembly 919 includes one or more lenses and an aperture. The communication module 915 includes instructions that, when executed, or circuits that, when activated, cause the camera 910 to receive a request for an image from a requesting device, retrieve a requested image from the storage 914, or send a retrieved image to the requesting device (e.g., the blur-estimation device 900).

Figure 10:
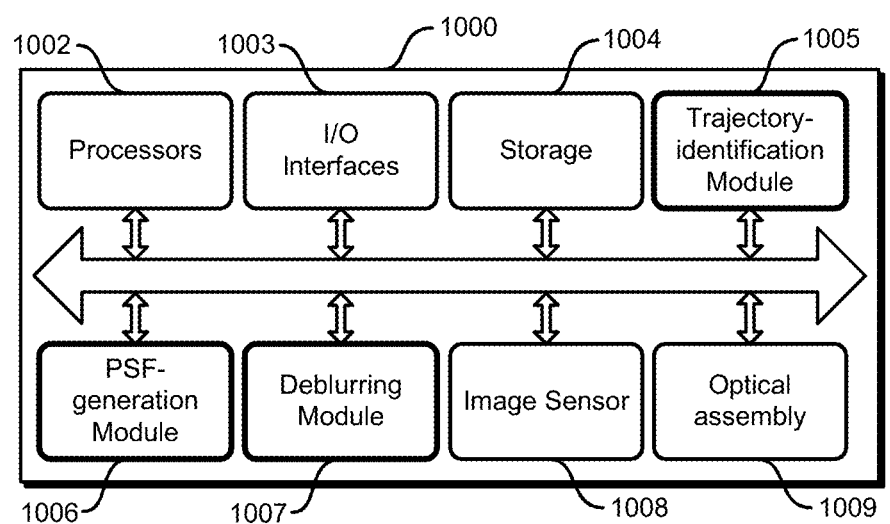
FIG. 10 illustrates an example embodiment of a blur-estimation device.

FIG. 10 illustrates an example embodiment of a blur-estimation device 1000. The blur-estimation device 1000 includes one or more processors 1002, one or more I/O interfaces 1003, storage 1004, a trajectory-identification module 1005, a PSF-generation module 1006, a deblurring module 1007, an image sensor 1008, and an optical assembly 1009. Thus, in this embodiment, the blur-estimation device 1000 also includes a camera. The blur-estimation device 1000 may also include a display. In some embodiments, the blur-estimation device 1000 automatically deblurs a captured image and then presents the deblurred image on the display.

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board that is inserted into a device or on a function-extension unit that is connected to the device, and a CPU provided on the function-extension board or unit may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A device comprising:
one or more computer-readable media; and
one or more processors that are coupled to the one or more computer-readable media and that are configured to cause the device to
obtain an image,
identify pixels in the image that have respective intensity values that equal or exceed a first intensity threshold in a first color channel, wherein each pixel in the image has a respective intensity value in the first color channel and a respective intensity value in a second color channel,
identify a trajectory based on the pixels in the image that have respective intensity values that equal or exceed the first intensity threshold in the first color channel,
identify multiple instances of the trajectory in the image,
identify an instance of the trajectory that includes pixels that have both respective intensity values in the first color channel that equal or exceed the first intensity threshold and respective intensity values in the second color channel that do not equal or exceed a second intensity threshold, and
generate a blur kernel based on the intensity values in the second color channel of the pixels in the instance of the trajectory.

2. The device of claim 1, wherein the first intensity threshold is a maximum possible intensity value of a pixel in the image.

3. The device of claim 1,
wherein each instance of the multiple instances of the trajectory includes respective pixels, and
wherein the respective pixels of each instance of the trajectory form a respective continuous path of pixels that have respective intensity values that equal or exceed the first intensity threshold in the first color channel.

4. The device of claim 1, wherein the one or more processors are further configured to cause the device to identify three or more instances of the trajectory.

5. The device of claim 1, wherein the one or more processors are further configured to cause the device to deblur the image based on the blur kernel.

6. The device of claim 1, wherein the one or more processors are further configured to cause the device to
describe the respective intensity values in the second color channel of the pixels in the instance of the trajectory with a weight matrix that is composed of intensity values in the second color channel of pixels in an area that includes the instance of the trajectory and other pixels, and
wherein, to generate the blur kernel based on the intensity values in the second color channel of the pixels in the instance of the trajectory, the one or more processors are further configured to cause the device to generate the blur kernel based on the weight matrix.

7. The device of claim 6, wherein, to generate the blur kernel based on the weight matrix, the one or more processors are further configured to cause the device to define the weight matrix to be the blur kernel.

8. The device of claim 1, further comprising a lens and a light sensor.

9. A method comprising:
obtaining an image, wherein each pixel in the image has a respective intensity value in two or more color channels;
identifying an instance of a trajectory in the image based on pixels in the image that have intensity values that exceed a first intensity threshold in a first color channel, wherein the instance of the trajectory is composed of pixels, and wherein the pixels that compose the instance of the trajectory have respective intensity values that exceed the first intensity threshold in the first color channel;
identifying a second color channel for which the pixels that compose the instance of the trajectory, which have intensity values that exceed the first intensity threshold in the first color channel, also have respective intensity values that do not equal or exceed a second intensity threshold; and
generating a blur kernel based on the intensity values in the second color channel of the pixels that compose the instance of the trajectory.

10. The method of claim 9, wherein the first intensity threshold is equal to the second intensity threshold.

11. The method of claim 9, further comprising:
generating a deblurred image based on the image and on the blur kernel.

12. The method of claim 9, further comprising:
receiving a user selection of an approximate trajectory.

13. The method of claim 9, further comprising:
identifying multiple instances of the trajectory in the image.

14. The method of claim 13, wherein identifying the multiple instances of the trajectory in the image includes
setting respective intensity values of pixels in the image that have intensity values that do not exceed the first intensity threshold in the first color channel to zero, and
after setting the respective intensity values of the pixels in the image that have intensity values that do not exceed the first intensity threshold in the first color channel to zero, comparing an area of the image that includes the instance of the trajectory to another area of the image.

15. One or more non-transitory computer-readable media storing instructions that, when executed by one or more computing devices, cause the one or more computing devices to:
obtain an image;
identify a trajectory in the image based on pixels in the image that have intensity values that exceed a first intensity threshold in a first color channel and intensity values that do not exceed a second intensity threshold in a second color channel, wherein the trajectory is composed of at least some of the pixels in the image that have intensity values that exceed the first intensity threshold in the first color channel and intensity values that do not exceed the second intensity threshold in the second color channel; and
generate a point spread function based on the intensity values in the second color channel of the pixels in the trajectory.

16. The one or more computer-readable media of claim 15, wherein the instructions, when executed by one or more computing devices, further cause the one or more computing devices to:
identify multiple instances of the trajectory in the image,
wherein each instance of the multiple instances of the trajectory includes respective pixels,
wherein the respective pixels of each instance of the trajectory include at least some of the pixels in the image that have intensity values that exceed the first intensity threshold in the first color channel and intensity values that do not exceed the second intensity threshold in the second color channel,
wherein the respective pixels of each instance of the trajectory form a respective continuous path of pixels that have respective intensity values that exceed the first intensity threshold in the first color channel, and
wherein the respective pixels of each instance of the trajectory are surrounded by pixels that have intensity values that do not exceed the first intensity threshold in the first color channel.

17. The one or more computer-readable media of claim 15, wherein the instructions, when executed by one or more computing devices, further cause the one or more computing devices to:
generate a deblurred image based on the image and on the point spread function.

18. The system of claim 1, wherein the instance of the trajectory includes only pixels that have both the respective intensity values that equal or exceed the first intensity threshold in the first color channel and the respective intensity values that do not equal or exceed the second intensity threshold in the second color channel.

19. The system of claim 1, wherein the blur kernel includes a plurality of entries, and each entry of the plurality of entries is proportional to the respective intensity value in the second color channel of one of the pixels in the instance of the trajectory.

20. The method of claim 9, wherein the first intensity threshold is one less than a maximum possible intensity value of a pixel in the image.

21. The method of claim 9, wherein the pixels that compose the instance of the trajectory are surrounded by pixels that have respective intensity values that do not exceed the first intensity threshold in the first color channel.

22. The method of claim 9, wherein the blur kernel includes a plurality of entries, and each entry of the plurality of entries is proportional to the respective intensity value in the second color channel of one of the pixels that compose the instance of the trajectory.

\* \* \* \* \*